United States Patent
Ganiger et al.

(10) Patent No.: US 11,976,593 B1
(45) Date of Patent: May 7, 2024

(54) BEARING ASSEMBLY

(71) Applicant: General Electric Company, Schenectady, NY (US)

(72) Inventors: Ravindra Shankar Ganiger, Bengaluru (IN); Kudum Shinde, Bengaluru (IN); Surender Reddy Bhavanam, Bengaluru (IN); Weize Kang, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/049,112

(22) Filed: Oct. 24, 2022

(51) Int. Cl.
| | |
|---|---|
| *F01D 25/16* | (2006.01) |
| *F02C 7/06* | (2006.01) |
| *F16C 19/54* | (2006.01) |
| *F16C 25/08* | (2006.01) |
| *F16C 27/06* | (2006.01) |

(52) U.S. Cl.
CPC ............. *F02C 7/06* (2013.01); *F01D 25/16* (2013.01); *F01D 25/162* (2013.01); *F01D 25/164* (2013.01); *F05D 2220/32* (2013.01); *F05D 2240/52* (2013.01); *F16C 19/54* (2013.01); *F16C 19/541* (2013.01); *F16C 25/083* (2013.01); *F16C 27/066* (2013.01); *F16C 2360/23* (2013.01)

(58) Field of Classification Search
CPC ...... F01D 25/164; F01D 25/16; F01D 25/162; F05D 2260/96; F02C 7/06; F16C 19/54; F16C 19/541; F16C 19/542; F16C 19/546; F16C 19/547; F16C 2360/23; F16C 2360/24; F16C 27/066
See application file for complete search history.

(56) References Cited

U.S. PATENT DOCUMENTS

| | | | |
|---|---|---|---|
| 3,994,541 A | 11/1976 | Geary et al. | |
| 9,382,812 B2 | 7/2016 | Meacham et al. | |
| 9,447,817 B2* | 9/2016 | Gallimore | ............... F02C 7/06 |
| 9,500,100 B2 | 11/2016 | Carter et al. | |
| 9,695,870 B2 | 7/2017 | Amador et al. | |
| 9,739,206 B2 | 8/2017 | Houston et al. | |
| 9,897,140 B2* | 2/2018 | Gorajski | ............... F01D 25/16 |
| 9,932,986 B2* | 4/2018 | DiBenedetto | ......... F16C 25/083 |
| 10,451,108 B2 | 10/2019 | Nakayama et al. | |
| 10,480,572 B2 | 11/2019 | Smedresman et al. | |

(Continued)

FOREIGN PATENT DOCUMENTS

| | | |
|---|---|---|
| FR | 2951232 A1 | 4/2011 |
| FR | 3127024 A1 | 3/2023 |

(Continued)

*Primary Examiner* — Justin D Seabe
*Assistant Examiner* — Behnoush Haghighian
(74) *Attorney, Agent, or Firm* — Venable LLP; Elizabeth C. G. Gitlin; Michele V. Frank

(57) ABSTRACT

A gas turbine engine including a rotating shaft and a bearing assembly. The bearing assembly is configured to support the rotating shaft. The bearing assembly has a first bearing and a second bearing. The first bearing is configured to support an axial load of the rotating shaft when a forward thrust of the rotating shaft is greater than ten percent. The second bearing is configured to support the axial load of the rotating shaft when a thrust of the rotating shaft is between ten percent forward thrust and ten percent aft thrust, inclusive of the end points.

20 Claims, 9 Drawing Sheets

(56) References Cited

U.S. PATENT DOCUMENTS

| | | | |
|---|---|---|---|
| 10,655,499 B2 * | 5/2020 | Duffy | F16C 27/08 |
| 10,823,002 B2 | 11/2020 | Ganiger et al. | |
| 10,823,003 B2 | 11/2020 | Aguilar et al. | |
| 11,021,994 B2 * | 6/2021 | Cartier | F16C 19/182 |
| 11,326,473 B2 | 5/2022 | Ellwood, III et al. | |
| 2014/0314599 A1 * | 10/2014 | Manninen | F04D 29/049 |
| | | | 417/423.12 |
| 2015/0362013 A1 * | 12/2015 | Gorajski | F16C 19/505 |
| | | | 384/512 |
| 2016/0160910 A1 * | 6/2016 | Gallimore | F16C 35/042 |
| | | | 384/448 |
| 2017/0122215 A1 | 5/2017 | Houston et al. | |
| 2018/0038378 A1 * | 2/2018 | DiBenedetto | F16C 25/083 |
| 2019/0195088 A1 * | 6/2019 | Duffy | F16C 35/04 |
| 2023/0243276 A1 * | 8/2023 | Quintin | F01D 25/16 |
| | | | 415/229 |

FOREIGN PATENT DOCUMENTS

| | | |
|---|---|---|
| FR | 3127025 A1 | 3/2023 |
| WO | 2013067010 A1 | 5/2013 |

* cited by examiner

US 11,976,593 B1

BEARING ASSEMBLY

TECHNICAL FIELD

The present disclosure relates generally to a bearing assembly.

BACKGROUND

A turbine engine generally includes a fan and a core section arranged in flow communication with one another. The turbine engine includes bearing assemblies to facilitate rotation between relative parts.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
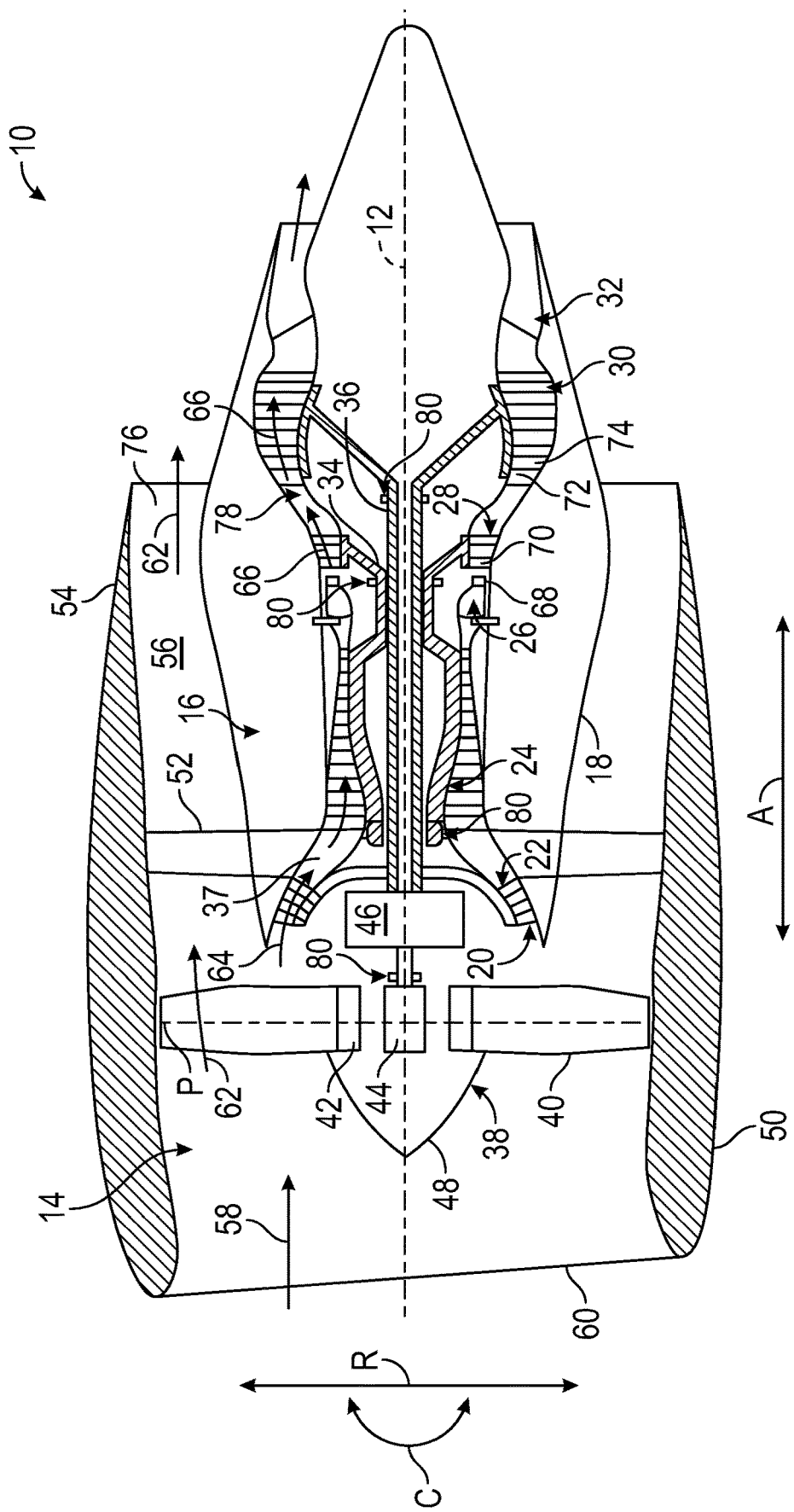
FIG. 1 is a schematic, cross-sectional view of a turbine engine, taken along a centerline axis of the turbine engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low," "mid" (or "mid-level"), and "high," or their respective comparative degrees (e.g., "lower" and "higher," when applicable), when used with compressor, turbine, shaft, fan, or turbine engine components, each refers to relative loads, thrusts, pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level") or "high" in such terms may additionally, or alternatively, be understood as relative to minimum allowable loads, thrusts, speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The terms "low thrust," "thrust crossover," and "thrust reversal" are used herein interchangeably. The terms are defined as an engine thrust from between ten percent forward thrust to ten percent aft thrust, inclusive of the end points and any point therebetween (e.g., 10% thrust to −10% thrust, inclusive of the endpoints and any point therebetween). This includes zero thrust conditions. The terms "thrust crossover" and "thrust reversal" are also defined as an engine condition where forward thrust switches to aft thrust and vice versa.

In engines, high transient vibration can occur in the rotating high pressure shaft ("N2 vibrations"). The vibration is at a high level during aircraft climb and returns to acceptable level during the remaining aircraft flight. The vibration is the thermal response of the rotor (e.g., the high pressure shaft) and is attributed to leakage across a piston seal ring, which causes lower rotor thrusts, ultimately causing stiffness changes. The leakage, combined with low ambient pressures at high altitudes, causes low rotor thrust and/or reverse rotor thrust in the high pressure shaft. This causes lower axial stiffness and lower radial stiffness of the bearing assembly, resulting in a dynamic response in the high pressure shaft. The dynamic response exhibits as vibration of the high pressure shaft and potential non-synchronous vibration (NSV) of the high pressure shaft.

The present disclosure includes a bearing assembly that provides stiffness during the aforementioned low thrust conditions to mitigate, to reduce, or to eliminate vibration in the high pressure shaft. The bearing assembly controls rotor thrust at the bearing, to maintain a minimum threshold value of axial reactions to avoid N2 vibrations. This is accomplished by increasing the axial stiffness acting on the bearing during the low thrust conditions. To accomplish this increase in axial stiffness without changing the axial stiffness of the bearing, a secondary, false bearing is included in the bearing assembly. The bearing assembly is constructed such that the false bearing provides additional axial stiffness during low thrust conditions. Thus, the false bearing provides vibration control at the thrust crossover, without changing the axial stiffness for the primary bearing. For example, during normal forward thrust conditions, the primary bearing may support the majority of the axial load provided by the rotating shaft. During low thrust conditions, the false bearing is activated to supplement and add axial stiffness to the bearing assembly, thus increasing the axial stiffness of the entire bearing assembly, allowing for mitigation of any vibrations that may be experienced by the high pressure shaft.

Although described with respect to the high pressure shaft, the low pressure shaft may also exhibit vibration such that the present disclosure may be applied to a bearing assembly supporting the low pressure shaft to mitigate, to reduce, or to eliminate vibration in the low pressure shaft.

Accordingly, the present disclosure provides a secondary, false bearing system that creates an active axial load path during load reversal and low thrust conditions. An active control system avoids NSV, bowed rotor start (BRS), and modal instability due to bearing variability. The present bearing assembly provides a secondary retention system for primary load path distress. In some examples of the present disclosure, there is a combination of ball bearings and roller bearings for the high pressure (HP) rotor supporting system for a geared low pressure (LP) rotor system. The configurations of the present disclosure provide a significant benefit to the N2 vibration, NSV, BRS vibration reduction, and increase the whirl stability (e.g., instability experienced in the shaft due to the rotation of the fan blades).

FIG. 1 shows a schematic cross-sectional view of a gas turbine engine 10. The gas turbine engine 10 defines an axial direction A extending parallel to a longitudinal, centerline axis 12 of the gas turbine engine 10, a radial direction R, and a circumferential direction C extending about the axial direction A. The gas turbine engine 10 includes a fan section 14 and a core turbine engine 16 disposed downstream from the fan section 14.

The core turbine engine 16 depicted includes an outer casing 18 that defines an annular inlet 20. The core turbine engine 16 includes, in serial flow relationship, a compressor section including a low pressure (LP) compressor 22 and a high pressure (HP) compressor 24, a combustion section 26, a turbine section including a high pressure (HP) turbine 28 and a low pressure (LP) turbine 30, and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. Accordingly, the LP shaft 36 and the HP shaft 34 are each rotary components, rotating about the longitudinal, centerline axis 12 in the circumferential direction C during operation of the gas turbine engine 10.

In order to support such rotary components, the gas turbine engine 10 includes a plurality of bearing assemblies 80 attached to various structural components within the gas turbine engine 10. For example, the bearing assemblies 80 may be located to facilitate rotation of the LP shaft 36 and the HP shaft 34. The bearing assemblies 80 may additionally, or alternatively, be located at any desired location along the LP shaft 36 and the HP shaft 34. The bearing assemblies 80 may be used in combination with oil-lubricated bearing assemblies, as will be discussed in more detail herein.

Referring still to FIG. 1, the fan section 14 includes a fan 38 having a plurality of fan blades 40 coupled to a disk 42 in a spaced apart manner. The disk 42 is covered by a hub 48. As depicted, the fan blades 40 extend radially outwardly from the disk 42 generally along the radial direction R. Each fan blade 40 is rotatable relative to the disk 42 about a pitch axis P by virtue of the fan blades 40 being operatively coupled to a pitch change mechanism 44. The fan blades 40, the disk 42, and the pitch change mechanism 44 are together rotatable about the longitudinal, centerline axis 12 by the LP shaft 36 across a power gearbox 46. The power gearbox 46 includes a plurality of gears for adjusting the rotational speed of the fan 38 relative to the LP shaft 36. More particularly, the fan section includes a fan shaft rotatable by the LP shaft 36 across the power gearbox 46. Accordingly, the fan shaft may also be considered to be a rotary component, and is similarly supported by a bearing assembly 80.

The fan section 14 includes an annular fan casing or outer nacelle 50 that circumferentially surrounds the fan 38 and/or at least a portion of the core turbine engine 16. The outer nacelle 50 is supported relative to the core turbine engine 16 by a plurality of circumferentially-spaced outlet guide vanes 52. A downstream section 54 of the outer nacelle 50 extends over an outer portion of the core turbine engine 16 so as to define a bypass airflow passage 56 therebetween.

During operation of the gas turbine engine 10, a volume of air 58 enters the gas turbine engine 10 through an inlet 60 of the outer nacelle 50 and/or the fan section 14. As the volume of air 58 passes across the fan blades 40, a first portion of the air 62 of the air 58 is directed or routed into the bypass airflow passage 56 and a second portion of air 64 of the air 58 is directed or routed into the core air flowpath 37, or, more specifically, into the LP compressor 22. The ratio between the first portion of air 62 and the second portion of air 64 is known as a bypass ratio. The pressure of the second portion of air 64 is then increased as it is routed through the high pressure (HP) compressor 24 and into the combustion section 26, where it is mixed with fuel and burned to generate combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and the HP turbine rotor blades 70 that are coupled to the HP shaft 34, thus, causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before the first portion of air 62 is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

Although depicted and described in conjunction with the gas turbine engine 10 of FIG. 1, aspects of the present disclosure may be incorporated into any other suitable gas turbine engine 10. For example, in other exemplary embodiments, aspects of the present disclosure may be incorporated into, e.g., a turbo fan engine (e.g., similar to the gas turbine engine 10 of FIG. 1), a turboprop engine, a turboshaft engine, or a turbojet engine.

The gas turbine engine 10 depicted in FIG. 1 is by way of example only. In other exemplary embodiments, the gas turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines. Further, in still other embodiments, aspects of the present disclosure may be incorporated into any other suitable turbomachine, including, without limitation, a steam turbine, a centrifugal compressor, a turbocharger, stationary turbomachinery, or other power generation turbomachines, or any type of rotating equipment using squeeze film dampers.

FIGS. 2 to 9 illustrate enlarged views of exemplary bearing assemblies that can be utilized in gas turbine engine 10. The bearing assemblies shown in FIGS. 2 to 9 may be any of the bearing assemblies 80 shown in FIG. 1. Features of any of the bearing assemblies of FIGS. 2 to 9 may be interchanged and/or combined with other embodiments of the bearing lubricant drain without departing from the scope of the present disclosure. The bearing assemblies described herein are not mutually exclusive and can be utilized simultaneously.

Figure 2:
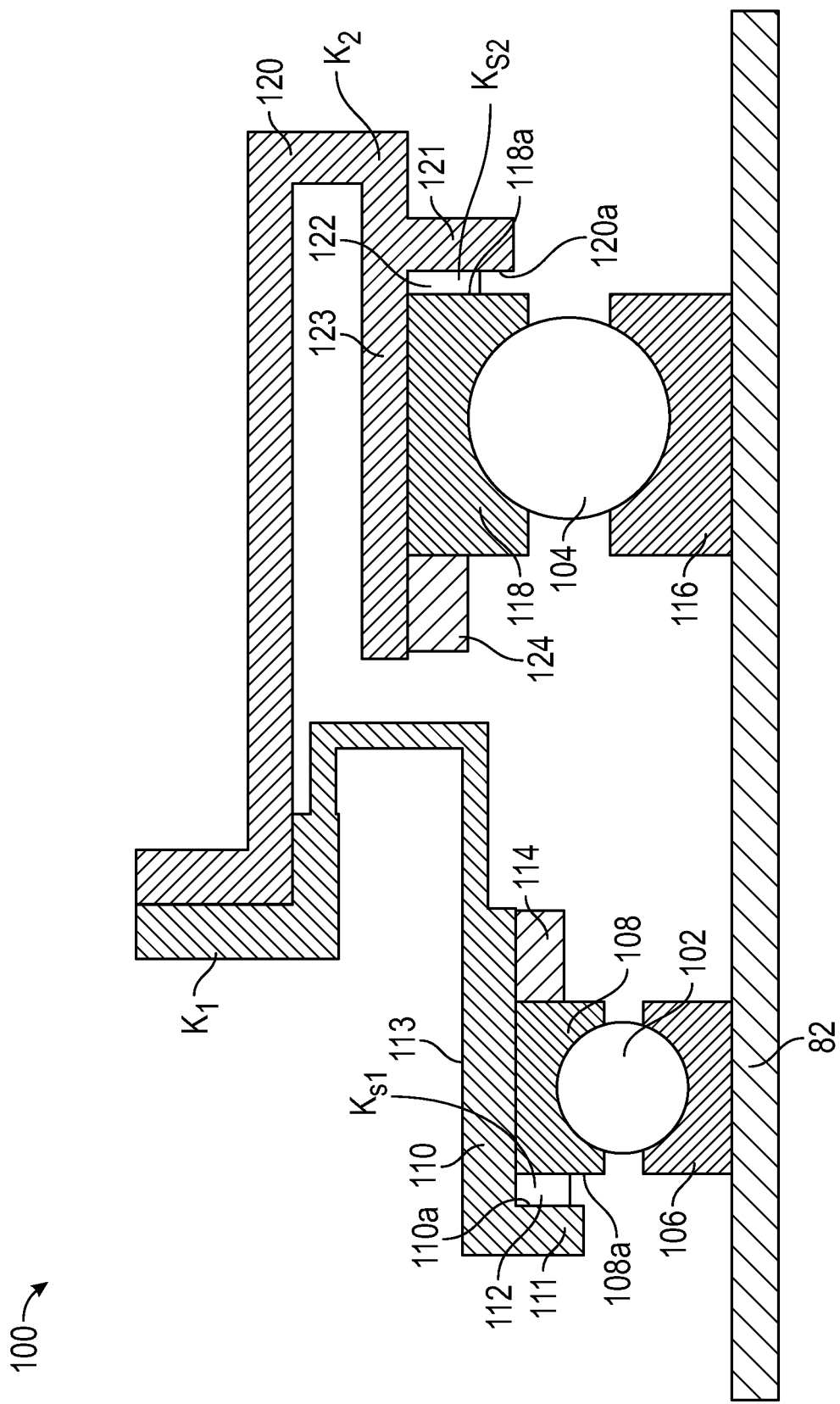
FIG. 2 is a schematic, cross-sectional view of a bearing assembly for the turbine engine of FIG. 1, according to the present disclosure.
Figure 3:
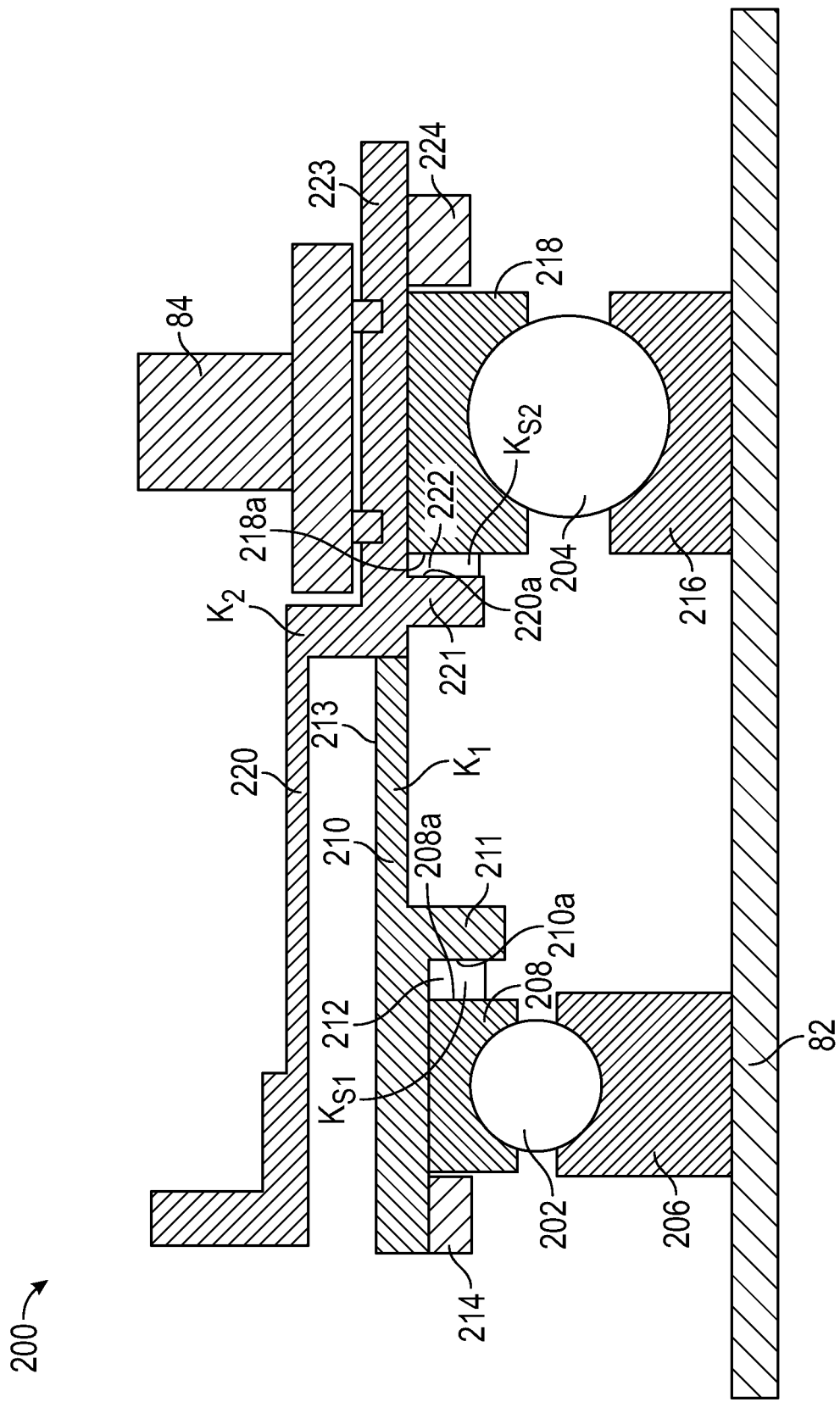
FIG. 3 is a schematic, cross-sectional view of a bearing assembly for the turbine engine of FIG. 1, according to the present disclosure.

The bearing assembly of FIGS. 2 and 3 provide a smaller secondary bearing support with a softer mounting system relative to the primary bearing. The primary bearing supports the rotor thrust (bi-directionally). During low thrust or thrust reversal conditions, the false bearing provides additional axial and radial stiffness to support the rotor. As will be explained with respect to FIG. 2, the secondary bearing has a lower load capacity due its relatively softer construction (as compared to the primary bearing), which result in the bearing being a "false bearing." The false bearing takes little or no load during high load conditions, but assists in taking the load at thrust crossover conditions. The bearing assembly of FIGS. 2 and 3 provide a secondary bearing system that creates an active axial load path for load reversal conditions, includes an active control system to avoid NSV, BRS, and modal instability due to bearing variability, and a secondary retention system for primary load path distress.

The term "spring" is used in describing the embodiments of FIGS. 2 and 3 for ease of description. However, as will be appreciated from the following disclosure, the spring may be any biasing member or biasing device that allows for selective compression and extension thereof. For example, the biasing member may be a spring, a temperature dependent (e.g., a high alpha material or a low alpha material) material, a strain dependent material a shape memory alloy, an electromagnet, a pneumatic device, a hydraulic device, etc. A high alpha material refers to a material with a relatively high coefficient of thermal expansion as compared to the remaining features of the bearing assemble and a low alpha material refers to a material with a relatively low coefficient of thermal expansion as compared to the remaining features of the bearing assembly.

FIG. 2 illustrates an exemplary embodiment of a bearing assembly 100. As mentioned, the bearing assembly 100 may be any of the bearing assemblies 80 described with respect to FIG. 1. Accordingly, like reference numerals in FIG. 2 align with like reference numerals in FIG. 1. The bearing assembly 100 may support rotation of a shaft 82, which may be the HP shaft 34. Although, as mentioned above, the bearing assembly 100 may be another of the bearing assemblies 80 of FIG. 1 and, thus, the shaft 82 may be the LP shaft 36.

The bearing assembly 100 may include a first bearing 102 and a second bearing 104 connected in a parallel bearing support arrangement. The first bearing 102 is supported by a first bearing inner race 106, a first bearing outer race 108, and a first bearing housing 110. A first bearing spring 112 is located between an axially forward facing outer surface 108a of the first bearing outer race 108 and an axially aft facing outer surface 110a of the first bearing housing 110. A first bearing locknut 114 secures the first bearing outer race 108 and the first bearing spring 112 to the first bearing housing 110. The second bearing 104 is supported by a second bearing inner race 116, a second bearing outer race 118, and a second bearing housing 120. A second bearing spring 122 is located between an axially aft facing outer surface 118a of the second bearing outer race 118 and an axially forward facing outer surface 120a of the second bearing housing 120. A second bearing locknut 124 secures the second bearing outer race 118 and the second bearing spring 122 to the second bearing housing 120. Accordingly, as shown in FIG. 2, the first bearing housing 110 and the second bearing housing 120 are coupled to the shaft 82 in parallel such that the first bearing 102 and the second bearing 104 are connected in parallel. The first bearing spring 112 and the second bearing spring 122 are shown schematically in FIG. 2. In some examples, the springs may be blocks of material or may be coil springs, such as shown and described with respect to FIGS. 4A and 4B.

As shown in FIG. 2, the axially aft facing outer surface 110a is located on a radially inward extending portion 111 of the first bearing housing 110. The radially inward extending portion 111 extends radially inward toward the centerline axis 12 (FIG. 1) from a generally annular portion 113 of the first bearing housing 110. The axially forward facing outer surface 120a is located on a radially inward extending portion 121 of the second bearing housing 120. The radially inward extending portion 121 extends radially inward toward the centerline axis 12 (FIG. 1) from a generally annular portion 123 of the second bearing housing 120.

The first bearing housing 110 has a first bearing housing stiffness $K_1$ that is less than a second bearing housing stiffness $K_2$ of the second bearing housing 120. Thus, relative to the second bearing housing 120, the first bearing housing 110 is softer. Stated another way, the second bearing housing 120 provides a greater radial stiffness support for the shaft 82 than the first bearing housing 110. The first bearing housing stiffness $K_1$ may be between ten percent and fifty percent, inclusive of the end points, less than the second bearing housing stiffness $K_2$.

The first bearing spring 112 has a first bearing spring stiffness $Ks_1$ that is less than a second bearing spring stiffness $Ks_2$ of the second bearing spring 122. Thus, relative to the second bearing spring 122, the first bearing spring 112 is softer. Stated another way, the second bearing spring 122 provides a greater axial stiffness support for the shaft 82 than the first bearing spring 112. The first bearing spring stiffness $Ks_1$ may be between ten percent and fifty percent, inclusive of the end points, less than the second bearing spring stiffness $Ks_2$.

Since the first bearing housing 110 and the first bearing spring 112 are softer and less stiff than the second bearing housing 120 and the second bearing spring 122, the second bearing 104 functions as the "primary bearing" and the first bearing 102 functions as a "false bearing." That is, during high load conditions (e.g., thrust above about ten percent) of the engine, the second bearing 104 supports the majority of the load (e.g., greater than fifty percent, in some examples, about eighty percent to about ninety five percent) or the full load of the rotating shaft 82 during forward thrust and aft thrust engine operating conditions (i.e., bi-directional support), while the first bearing 102 supports little load (e.g., about five percent to about 20 percent) to no load during these engine conditions. The first bearing 102 supports the load of the rotating shaft 82 during thrust crossover conditions. That is, during low thrust conditions and/or during crossover as forward thrust switches to aft thrust and vice versa, the first bearing 102 may support the rotational load of the shaft 82 in conjunction with the second bearing 104. In some examples, during the thrust crossover conditions or low thrust conditions, the first bearing 102 supports the majority of the load (e.g., greater than fifty percent, in some examples, about eighty percent to about one hundred percent) and the second bearing 104 supports little load (e.g., about zero percent to about twenty percent). Low thrust and/or thrust crossover conditions may be defined from ten percent forward thrust to ten percent aft thrust, inclusive of the end points. During this condition (e.g., low thrust or thrust reversal conditions), the false bearing (i.e., the first bearing 102) provides axial stiffness (due to the first bearing spring 112) and radial stiffness (due to the first bearing housing 110) that supports the rotor (i.e., the shaft 82).

The bearing assembly of FIG. 3 provides a smaller secondary series connected bearing support with a softer mounting system relative to the primary bearing. The primary bearing supports the rotor thrust (bi-directionally). During low thrust or thrust reversal conditions, the false bearing provides additional axial and radial stiffness to support the rotor. As will be explained with respect to FIG. 3, the secondary bearing has a lower load capacity due its relatively softer construction (as compared to the primary bearing), which result in the bearing being a "false bearing." The false bearing takes little or no load during high load conditions, but assists in taking the load at thrust crossover conditions. The bearing assembly of FIG. 2 provides a secondary bearing system that creates an active axial load path for load reversal conditions, includes an active control system to avoid NSV, BRS, and modal instability due to bearing variability, and a secondary retention system for primary load path distress.

FIG. 3 illustrates an exemplary embodiment of a bearing assembly 200. As mentioned, the bearing assembly 200 may be any of the bearing assemblies 80 described with respect to FIG. 1. Accordingly, like reference numerals in FIG. 3 align with like reference numerals in FIG. 1. The bearing assembly 200 may support rotation of a shaft 82, which may be the HP shaft 34. Although, as mentioned above, the bearing assembly 200 may be another of the bearing assemblies 80 of FIG. 1 and, thus, the shaft 82 may be the LP shaft 36.

The bearing assembly 200 may include a first bearing 202 and a second bearing 204 connected in a series bearing support arrangement. The first bearing 202 is supported by a first bearing inner race 206, a first bearing outer race 208, and a first bearing housing 210. A first bearing spring 212 is located between an axially aft facing outer surface 208a of the first bearing outer race 208 and an axially forward facing outer surface 210a of the first bearing housing 210. A first bearing locknut 214 secures the first bearing outer race 208 and the first bearing spring 212 to the first bearing housing 210. The second bearing 204 is supported by a second bearing inner race 216, a second bearing outer race 218, and a second bearing housing 220. A second bearing spring 222 is located between an axially forward facing outer surface 218a of the second bearing outer race 218 and an axially aft facing outer surface 220a of the second bearing housing 220. A second bearing locknut 224 secures the second bearing outer race 218 and the second bearing spring 222 to the second bearing housing 220. Accordingly, as shown in FIG. 3, the first bearing housing 210 and the second bearing housing 220 are coupled to the shaft 82 in series such that the first bearing 202 and the second bearing 204 are connected in series. That is, the first bearing housing 210 extends from the second bearing housing 220. The first bearing spring 212 and the second bearing spring 222 are shown schematically in FIG. 3. In some examples, the springs may be blocks of material or may be coil springs, such as shown and described with respect to FIGS. 4A and 4B.

As shown in FIG. 3, the axially forward facing outer surface 210a is located on a radially inward extending portion 211 of the first bearing housing 210. The radially inward extending portion 211 extends radially inward toward the centerline axis 12 (FIG. 1) from a generally annular portion 213 of the first bearing housing 210. The axially aft facing outer surface 220a is located on a radially inward extending portion 221 of the second bearing housing 220. The radially inward extending portion 221 extends radially inward toward the centerline axis 12 (FIG. 1) from a generally annular portion 223 of the second bearing housing 220. A damper 84 may be provided around the annular portion 213. The damper reduces vibration and dampens the rotor to assist in mitigating vibration.

The first bearing housing 210 has a first bearing housing stiffness $K_1$ that is less than a second bearing housing stiffness $K_2$ of the second bearing housing 220. Thus, relative to the second bearing housing 220, the first bearing housing 210 is softer. Stated another way, the second bearing housing 220 provides a greater radial stiffness support for the shaft 82 than the first bearing housing 210. The first bearing housing stiffness $K_1$ may be between ten percent and fifty percent, inclusive of the end points, less than the second bearing housing stiffness $K_2$.

The first bearing spring 212 has a first bearing spring stiffness $Ks_1$ that is less than a second bearing spring stiffness $Ks_2$ of the second bearing spring 222. Thus, relative to the second bearing spring 222, the first bearing spring 212 is softer. Stated another way, the second bearing spring 222 provides a greater axial stiffness support for the shaft 82 than the first bearing spring 212. The first bearing spring stiffness $Ks_1$ may be between ten percent and fifty percent, inclusive of the end points, less than the second bearing spring stiffness $Ks_2$.

Since the first bearing housing 210 and the first bearing spring 212 are softer and less stiff than the second bearing housing 220 and the second bearing spring 222, the second bearing 204 functions as the "primary bearing" and the first bearing 202 functions as a "false bearing." That is, during normal operation of the gas turbine engine 10, the second bearing 204 supports the majority of the load (e.g., greater than about fifty percent, in some examples, about eighty percent to about ninety five percent) or the full load of the rotating shaft 82 during forward thrust and aft thrust engine operating conditions (i.e., bi-directional support), while the first bearing 202 supports little load (e.g., about five percent to about twenty percent) or no load during these engine conditions. The first bearing 202 supports the load of the rotating shaft 82 during thrust crossover conditions. That is, during low thrust conditions and/or during crossover as forward thrust switches to aft thrust and vice versa, the first bearing 202 may support the rotational load of the shaft 82. In some examples, during the thrust crossover conditions or low thrust conditions, the first bearing 202 supports the majority of the load (e.g., greater than fifty percent, in some examples, about eighty percent to about one hundred percent) and the second bearing 204 supports little load (e.g., about zero percent to about twenty percent). Low thrust and/or thrust crossover conditions may be defined from ten percent forward thrust to ten percent aft thrust, inclusive of the end points. During this condition (e.g., low thrust or thrust reversal conditions), the false bearing (i.e., the first bearing 202) provides axial stiffness (due to the first bearing spring 212) and radial stiffness (due to the first bearing housing 210) that supports the rotor (i.e., the shaft 82).

Figure 4A:
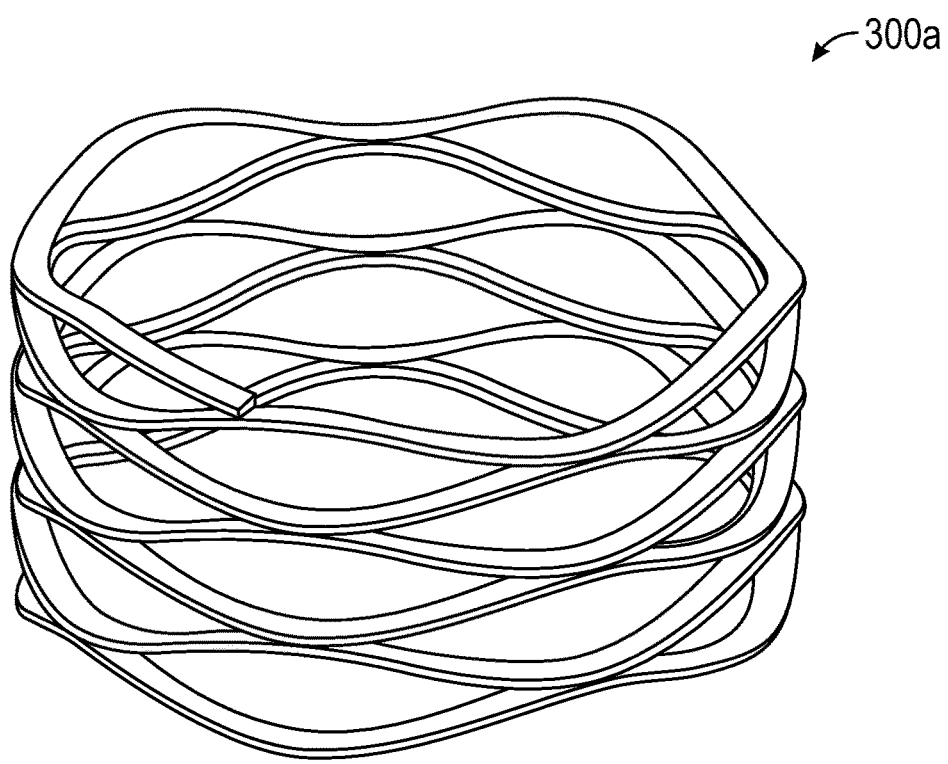
FIG. 4A is a schematic, perspective view of a spring for use in a bearing assembly, according to the present disclosure.
Figure 4B:
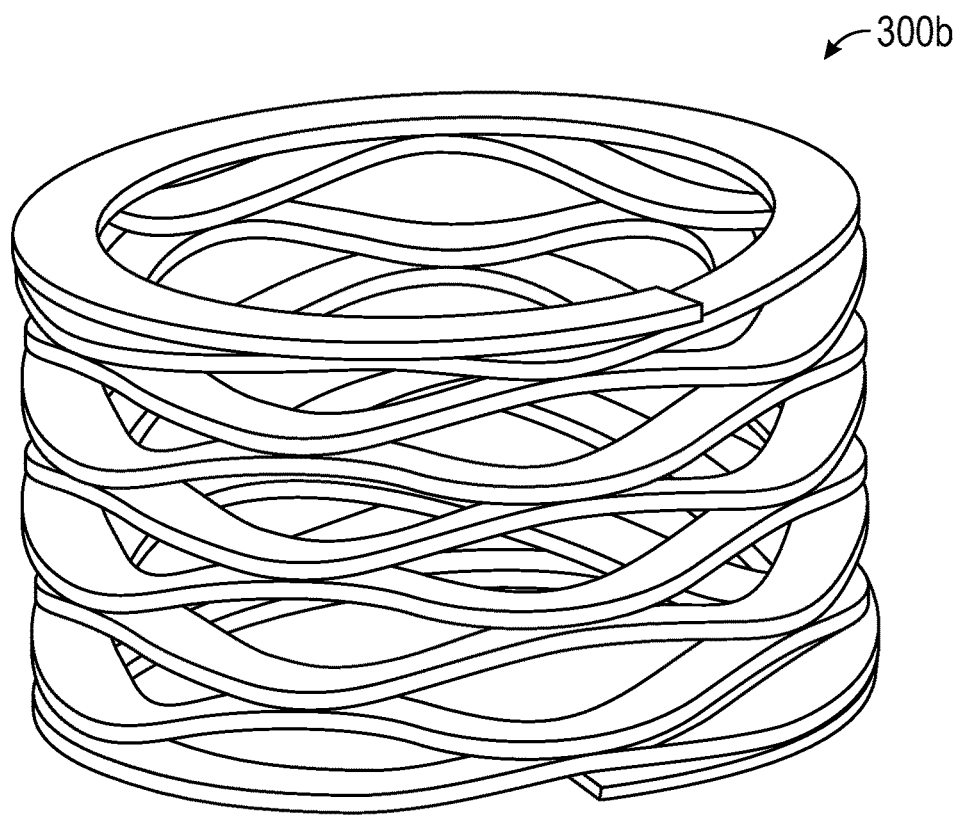
FIG. 4B is a schematic, perspective view of a spring for use in a bearing assembly, according to the present disclosure.

FIGS. 4A and 4B illustrate exemplary springs 300a and 300b, respectively. The spring 300a or the spring 300b may be employed in any or all of the first bearing spring 112, the second bearing spring 122, the first bearing spring 212, or the second bearing spring 222, or any combination. The spring 300a is a spring having plain ends. The spring 300b is a spring having shim ends. In some examples, any or all of the first bearing spring 112, the second bearing spring 122, the first bearing spring 212, or the second bearing spring 222, or any combination thereof, may be a block or a section of material. The material may be a strain based shape memory alloy (e.g., load dependent variable stiffness), or a temperature based shape memory alloy (e.g., thermal dependent variable stiffness, such as, for example, but not limited to, a high alpha material or a low alpha material), or any combination thereof. The springs in the bearing may be the same or may be different, and when different, any combination of the aforementioned is contemplated. For example, the first bearing spring 112 may be different than the second bearing spring 122. In another example, the first bearing spring 112 is the same as the second bearing spring 122. Regardless of the type of spring utilized it will be understood that the spring stiffness may be varied to accommodate the above disclosure.

Figure 5:
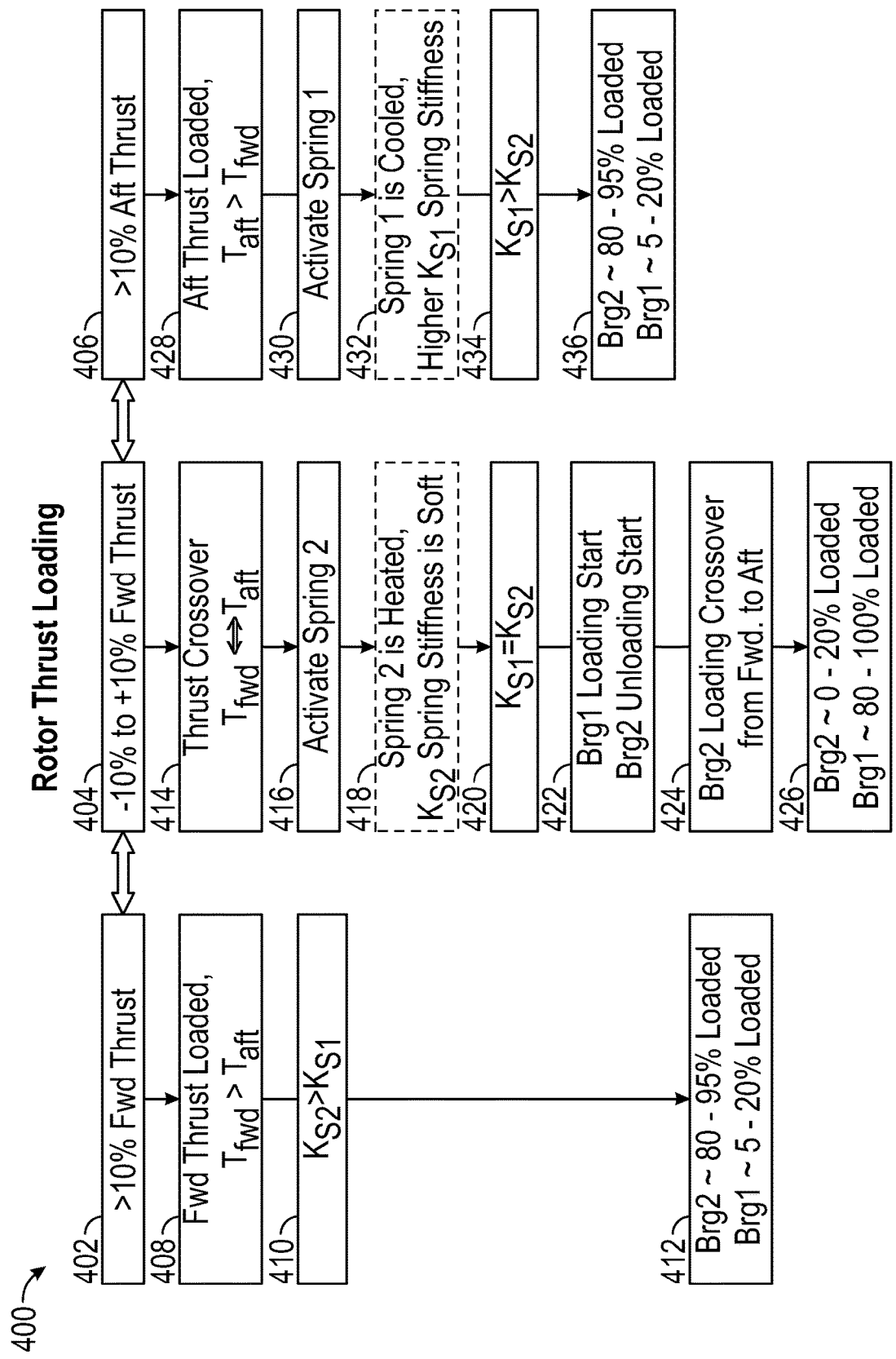
FIG. 5 is a schematic flow diagram illustrating loading of a bearing assembly for the turbine engine of FIG. 1, according to the present disclosure.
Figure 6:
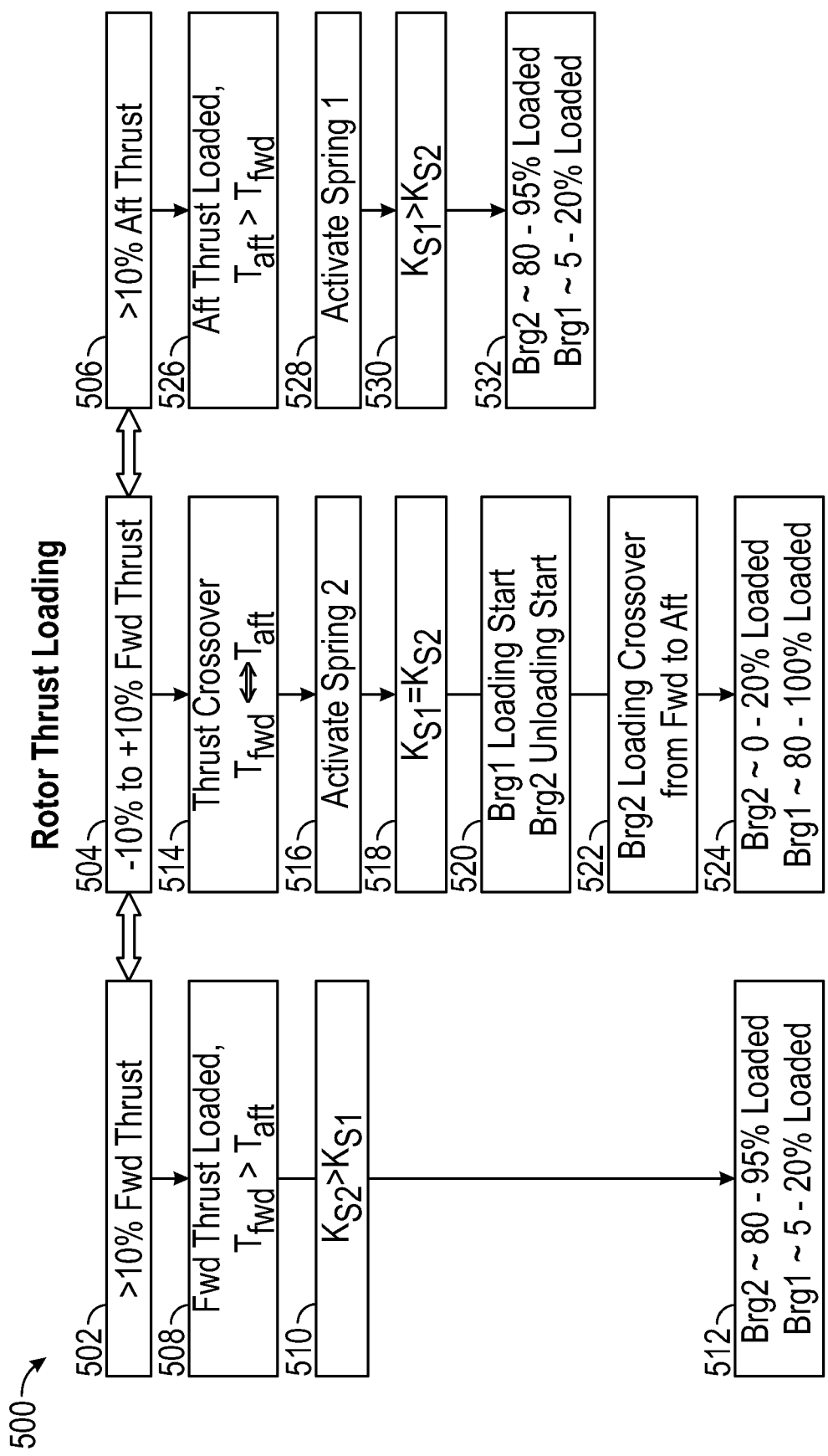
FIG. 6 is a schematic flow diagram illustrating loading of a bearing assembly for the turbine engine of FIG. 1, according to the present disclosure.

FIGS. 5 and 6 illustrate exemplary control systems for controlling the loading on the aforementioned bearings based on a thrust condition of the rotating shaft 82. FIG. 5 represents an active control system. FIG. 6 illustrates a passive control system. Features of both control systems may be interchanged between FIGS. 5 and 6 such that some aspects of the control are active and some aspects are passive. The type of control system employed may be based on the type of spring employed in the bearing assembly. For example, when the spring is a shape memory alloy, a temperature dependent material, and/or a strain dependent material, active control may be required to activate the spring and to engage the appropriate bearing to support the load of the rotating shaft.

In the systems of FIGS. 5 and 6, the first bearing, the first bearing spring, the first bearing housing stiffness, the first bearing spring stiffness, the first bearing assembly, etc., represent the false bearing and related components (e.g., the first bearing 102 described with respect to FIG. 2 and the first bearing 202 described with respect to FIG. 3, and related components). The second bearing, the second bearing spring, the second bearing housing stiffness, the second bearing spring stiffness, the second bearing assembly, etc., represent the primary bearing and related components (e.g., the second bearing 104 described with respect to FIG. 2 and the second bearing 204 described with respect to FIG. 3, and related components). The rotor as described with respect to FIGS. 5 and 6 represents the rotating shaft 82 described with respect to FIGS. 2 and 3.

FIG. 5 illustrates an exemplary active control system 400. The exemplary active control system 400 illustrates operation and control of the false bearing (e.g., the first bearing 102 described with respect to FIG. 2 and the first bearing 202 described with respect to FIG. 3). The gas turbine engine 10 (FIG. 1) has three operating conditions of the rotor (e.g., the rotating shaft 82) in which the false bearing is controlled. A first operating condition 402 when the gas turbine engine 10 is operating at greater than about ten percent forward thrust, a second operating condition 404 when the gas turbine engine 10 is operating at a thrust crossover condition, between about ten percent aft thrust and ten percent forward thrust, inclusive of the endpoints, and a third operating condition 406 when the gas turbine engine 10 is operating at greater than about ten percent aft thrust.

Referring to FIG. 5, during the first operating condition 402, and as shown at block 408, the rotor is in a forward thrust condition. That is, the forward thrust $T_{fwd}$ of the rotor is greater than the aft thrust $T_{aft}$ of the rotor. In this condition, the thrust in the forward direction is greater than about ten percent full thrust power. Since, as shown at block 410, the stiffness $Ks_2$ of the second bearing spring is greater than the stiffness $Ks_1$ of the first bearing spring (as is true for both examples described with respect to FIG. 2 and FIG. 3), the second bearing is loaded with a greater load than that of the first bearing. As shown at block 412, the second bearing is loaded with about eighty percent to about ninety five percent, inclusive of the endpoints, of the rotational load exhibited by the rotating shaft. The first bearing is loaded with about five percent to about twenty percent, inclusive of the endpoints, of the rotational load exhibited by the rotating shaft. In some examples, the second bearing supports the full load of the rotating shaft and the first bearing supports no load. Thus, the primary bearing is now supporting the majority of the load or the full load of the rotating shaft.

With continued reference to FIG. 5, during the second operating condition 404, and, as shown in block 414, the rotor is in a crossover thrust condition. That is, the forward thrust $T_{fwd}$ of the rotor is with ten percent of the aft thrust $T_{aft}$ of the rotor. In this condition, the false bearing, also referred to as the first bearing, will support the load of the rotating shaft, instead of or in conjunction with the primary bearing, also referred to as the second bearing. For example, the false bearing may support the majority of the load (e.g., more than fifty percent of the load), and in some examples, may support between about eighty percent and about one hundred percent of the load, while the primary bearing supports less load than the false bearing (e.g., about zero percent to about twenty percent). In order for the false bearing to assume the load, the primary bearing spring is activated in block 416. In cases when the second spring is formed of a temperature dependent material (e.g., a shape memory alloy), the second spring is heated to reduce the stiffness of the second spring, as shown in block 418. Although, as described previously, the second spring may be formed of other materials and, thus, may be activated in different manners than shown at block 418. For example, the spring may be formed of a high alpha material, that, when heated, the material grows to contact the outer race, thus, stiffening the bearing.

Once the second spring is activated, in this case, by softening the second spring, the stiffness of the second spring is reduced. In some examples, as shown at block 420, the stiffness of the second spring may be about the same as the stiffness of the first spring. The ability of the first spring to bear the load is increased, assisting in bearing the load of the rotor. That is, as shown at block 422, the second bearing begins to become unloaded at the same time as the first bearing begins to become loaded. This is due to the increased ability of the first spring to bear the load. Stated another way, and, as shown at block 424, there is a bearing load crossover from the second bearing to the first bearing as there is thrust crossover from forward thrust to aft thrust (and vice versa). At this point, as shown at block 426, the second bearing is loaded with about zero percent to about twenty percent, inclusive of the endpoints, of the load exhibited by the rotating shaft. The first bearing is loaded with about eighty percent to about one hundred percent, inclusive of the endpoints, of the rotational load exhibited by the rotating shaft. Thus, the false bearing is now supporting the majority of the load or the full load of the rotating shaft.

During the third operating condition 406, and as shown block 428, the rotor is in an aft thrust condition. That is, the aft thrust $T_{aft}$ of the rotor is greater than the forward thrust $T_{fwd}$ of the rotor. In this condition, the thrust in the aft direction is greater than about ten percent full thrust power. In this condition, the primary bearing, also referred to as the second bearing, will take the load of the rotating shaft, instead of the false bearing, also referred to as the first bearing, which was taking the load during the crossover condition. In order for the primary bearing to once again assume the load, the false bearing spring is activated in block 430. In cases when the first spring is formed of a temperature dependent material (e.g., a shape memory alloy), the first spring is cooled to increase the stiffness of the first spring, as shown in block 432. Although, as described previously, the first spring may be formed of other materials and, thus, may be activated in different manners than shown at block 432. Once the first spring is activated, the stiffness of the first spring is increased. In some examples, as shown at block 434, the stiffness of the first spring is greater than the stiffness of the second spring. The ability of the first spring to bear the load is increased. That is, as shown at block 436, the second bearing begins to become loaded again and the bearings together share a higher load. As shown at block 436, the second bearing is loaded with about eighty percent to about ninety five percent, inclusive of the endpoints, of the rotational load exhibited by the rotating shaft. The first bearing is loaded with about five percent to about twenty percent, inclusive of the endpoints, of the rotational load exhibited by the rotating shaft. In some examples, the second bearing supports the full load of the rotating shaft and the first bearing supports no load. Thus, the primary bearing is now supporting the majority of the load or the full load of the rotating shaft.

FIG. 6 illustrates an exemplary passive control system 500. The control system 500 illustrates operation and control of the false bearing (e.g., the first bearing 102 described with respect to FIG. 2 and the first bearing 202 described with respect to FIG. 3). The gas turbine engine 10 (FIG. 1) has three operating conditions of the rotor (e.g., the rotating shaft 82) in which the false bearing is controlled. The three operating conditions are a first operating condition 502 when the gas turbine engine 10 is operating at greater than about ten percent forward thrust, a second operating condition 504 when the gas turbine engine 10 is operating at a thrust crossover condition, between about ten percent aft thrust and ten percent forward thrust, inclusive of the endpoints, and a third operating condition 506 when the gas turbine engine 10 is operating at greater than about ten percent aft thrust.

Referring to FIG. 6, during the first operating condition 502, and, as shown at block 508, the rotor is in a forward thrust condition. That is, the forward thrust $T_{fwd}$ of the rotor is greater than the aft thrust $T_{aft}$ of the rotor. In this condition, the thrust in the forward direction is greater than about ten percent full thrust power. Since, as shown at block 510, the stiffness $Ks_2$ of the second bearing spring is greater than the stiffness $Ks_1$ of the first bearing spring (as is true for both examples described with respect to FIG. 2 and FIG. 3), the second bearing is loaded with a greater load than that of the first bearing. As shown at block 512, the second bearing is loaded with about eighty percent to about ninety five percent, inclusive of the endpoints, of the rotational load exhibited by the rotating shaft. The first bearing is loaded with about five percent to about twenty percent, inclusive of the endpoints, of the rotational load exhibited by the rotating shaft. In some examples, the second bearing supports the full load of the rotating shaft and the first bearing supports no load. Thus, the primary bearing is now supporting the majority of the load or the full load of the rotating shaft.

With continued reference to FIG. 6, during the second operating condition 504, and, as shown block 514, the rotor is in a crossover thrust condition. That is, the forward thrust $T_{fwd}$ of the rotor is with ten percent of the aft thrust $T_{aft}$ of the rotor. In this condition, the false bearing, also referred to as the first bearing, will take the load of the rotating shaft, instead of the primary bearing, also referred to as the second bearing. In order for the false bearing to assume the load, the primary bearing spring is activated in block 516. In contrast to the exemplary active control system 400, the activation of the primary bearing spring is passive. That is, no external force needs to be applied to activate the spring. For example, the reduction in load on the bearing may activate the spring. The spring may still be a temperature dependent material or a strain dependent material, but, in the passive case, the natural conditions of the engine environment activate the spring. Once the second spring is activated, in this case, by softening the second spring, the stiffness of the second spring is reduced. In some examples, as shown at block 518, the stiffness of the second spring may be about the same as the stiffness of the first spring. The ability of the first spring to bear the load is increased, assisting in bearing the load of the rotor. That is, as shown at block 520, the second bearing begins to become unloaded at the same time as the first bearing begins to become loaded. This is due to increased ability of the first spring to bear the load. Stated another way, and, as shown at block 522, there is a bearing load crossover from the second bearing to the first bearing as there is thrust crossover from forward thrust to aft thrust (and vice versa). At this point, as shown at block 524, the second bearing is loaded with about zero percent to about twenty percent, inclusive of the endpoints, of the load exhibited by the rotating shaft. The first bearing is loaded with about eighty percent to about one hundred percent, inclusive of the endpoints, of the rotational load exhibited by the rotating shaft. Thus, the false bearing is now supporting the majority of the load or the full load of the rotating shaft.

During the third operating condition 506, and, as shown block 526, the rotor is in an aft thrust condition. That is, the aft thrust $T_{aft}$ of the rotor is greater than the forward thrust $T_{fwd}$ of the rotor. In this condition, the thrust in the aft direction is greater than about ten percent full thrust power. In this condition, the primary bearing, also referred to as the second bearing, will take the load of the rotating shaft, instead of the false bearing, also referred to as the first bearing, which was taking the load during the crossover condition. In order for the primary bearing to once again assume the load, the false bearing spring is activated in block 528. Once the first spring is activated, the stiffness of the first spring is increased. In some examples, as shown at block 530, the stiffness of the first spring is greater than the stiffness of the second spring. The ability of the first spring to bear the load is increased. That is, as shown at block 532, the second bearing begins to become loaded again and the bearings share a higher load. As shown at block 532, the second bearing is loaded with about eighty percent to about ninety five percent, inclusive of the endpoints, of the rotational load exhibited by the rotating shaft. The first bearing is loaded with about five percent to about twenty percent, inclusive of the endpoints, of the rotational load exhibited by the rotating shaft. In some examples, the second bearing supports the full load of the rotating shaft and the first bearing supports no load. Thus, the primary bearing is now supporting the majority of the load or the full load of the rotating shaft.

Although FIGS. 5 and 6 describe activating the second spring in the thrust crossover condition, alternatively, or additionally, the first spring may be activated. That is, for example, instead of, or in addition to, softening the second spring, the first spring may be strengthened to a point where the first spring is stiffer than the second spring to allow the first spring to bear more load than the second spring. Likewise, in the greater than ten percent aft thrust condition, instead of or in addition to activating the first spring, the second spring may be activated.

Figure 7:
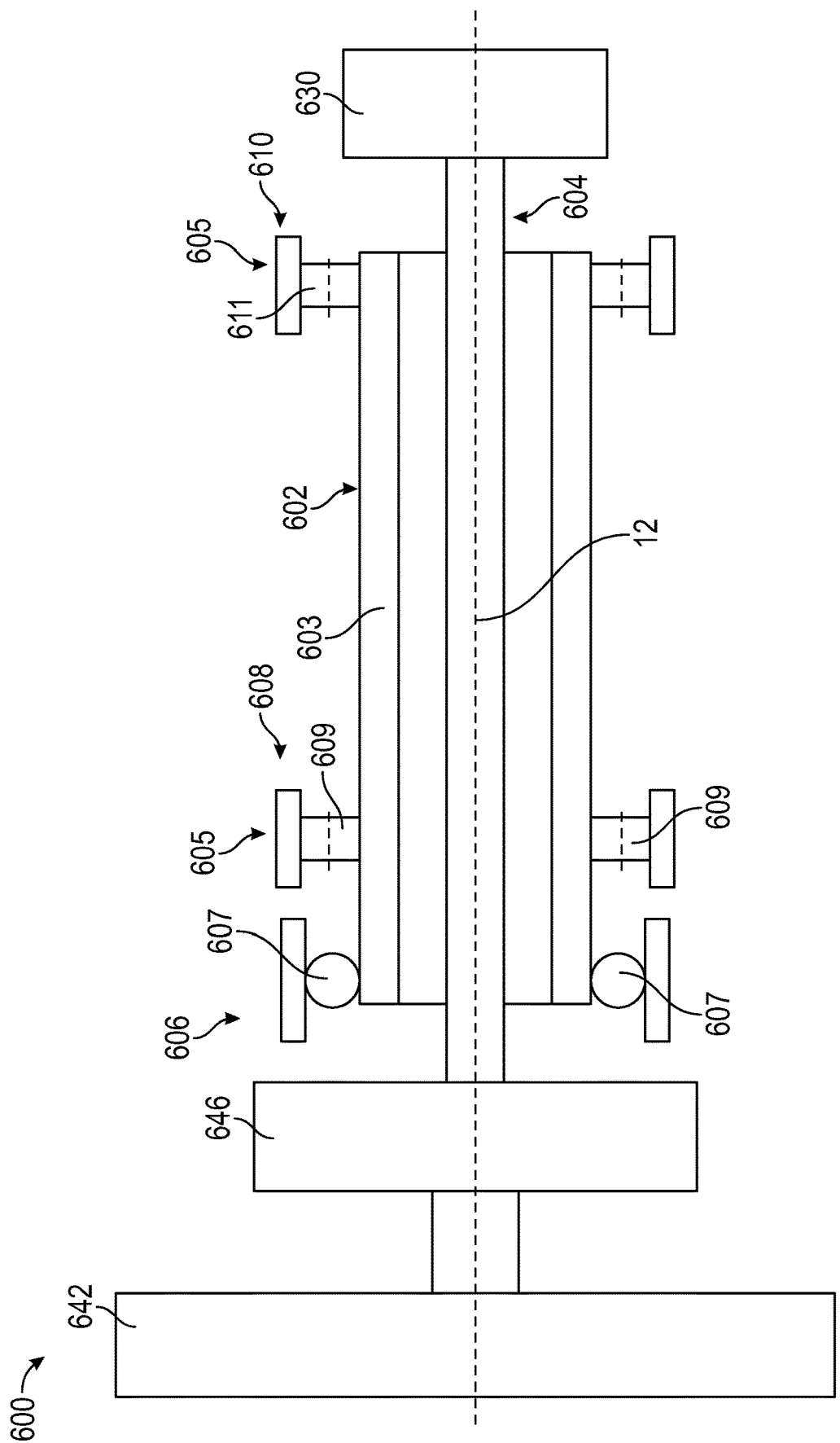
FIG. 7 is a schematic view of a turbine engine having a bearing assembly, according to the present disclosure.
Figure 8:
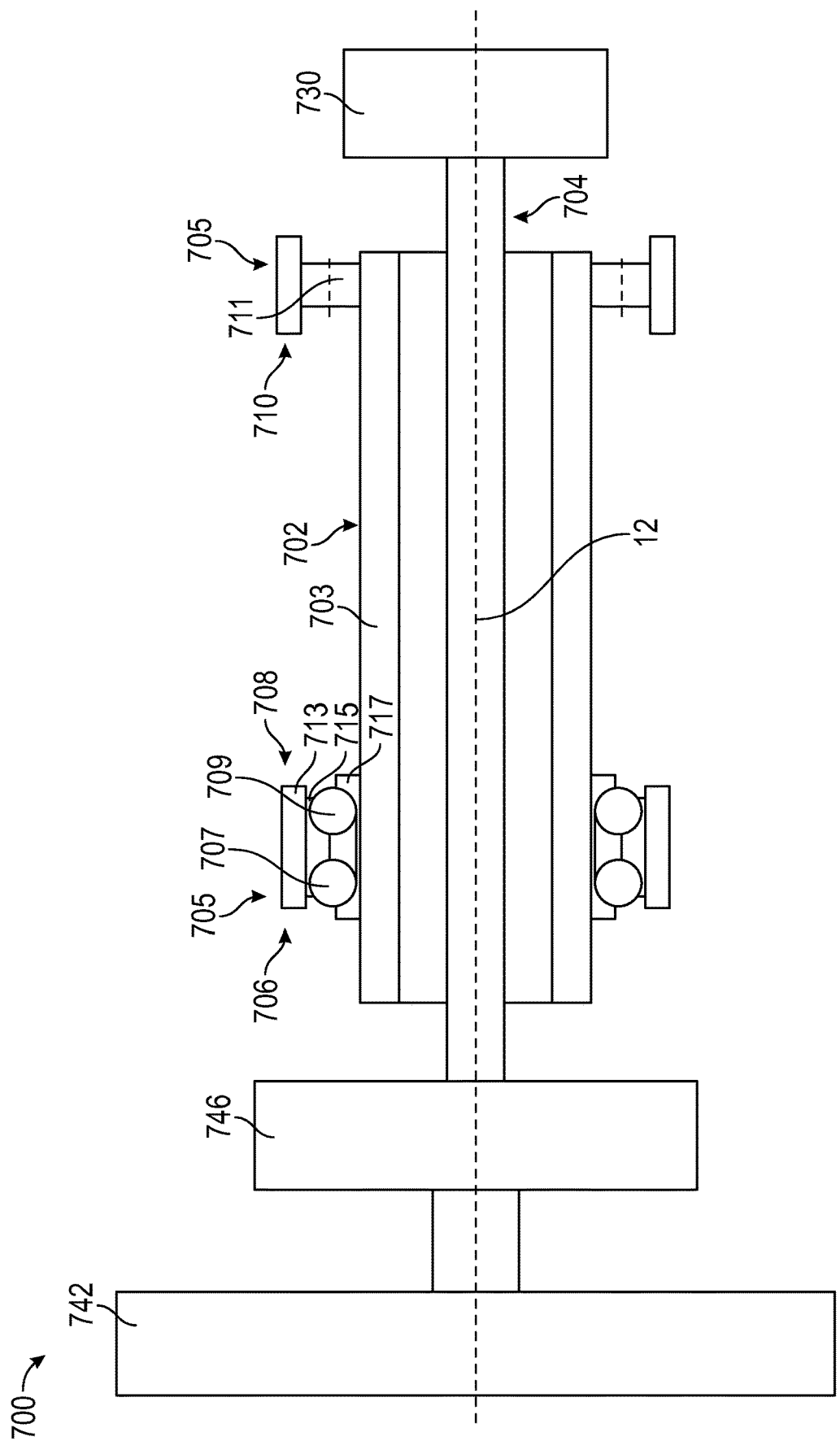
FIG. 8 is a schematic view of a turbine engine having a bearing assembly, according to the present disclosure.

FIGS. 7 and 8 illustrate exemplary engines having bearing assemblies to support a rotating load of a rotor. In the examples of FIGS. 7 and 8, as an alternative to the bearing assembly 100 or the bearing assembly 200, the engines may include bearings with a small duplex bearing or a four-point contact bearing with axial pre-loading springs. In the examples of FIGS. 7 and 8, the ratio of the HP rotor system to the LP rotor system speeds is between two and ten. The ratio of the aft roller bearing support stiffness to the total stiffness of the forward ball and roller bearings is between about two and about ten, inclusive of the end points. The bearing assemblies of FIGS. 7 and 8 support the rotating shaft during thrust crossover conditions and low thrust conditions to minimize or to mitigate vibrations exhibited in the shaft.

FIG. 7 illustrates an exemplary engine 600 having a centerline axis 12. The engine 600 has a high pressure (HP) rotor system 602 and a low pressure (LP) rotor system 604. The engine 600 includes a fan rotor 642, a gear box 646, and a low pressure turbine rotor 630. The HP rotor system 602 and the LP rotor system 604 may include features described with respect to FIG. 1. The HP rotor system 602 may include a high pressure (HP) shaft 603 that is supported by a bearing assembly 605. The bearing assembly 605 includes a first bearing assembly 606, a second bearing assembly 608, and a third bearing assembly 610.

As shown in FIG. 7, the first bearing assembly 606 may include one or more ball bearings 607. The second bearing assembly 605 may include one or more roller bearings 609. The one or more ball bearings 607 may be stiff in the radial direction and, thus, not affected by axial thrust. In some examples, the second bearing assembly 605 does not include a squeeze film damper. The first bearing assembly 606 and the second bearing assembly 608 may include a single bearing housing. That is, for example, the one or more ball bearings 607 and the one or more roller bearings 609 may be supported by the same bearing housing. Although the first bearing assembly 606 and the second bearing assembly 608 share the same bearing housing, each of the respective one or more ball bearings 607 and one or more roller bearings 609, may have individual outer races and inner races to support the bearings (e.g., as shown and described with respect to FIGS. 2 and 3). The third bearing assembly 610 may include one or more roller bearings 611.

FIG. 8 illustrates an exemplary engine 700 having a centerline axis 12. The engine 700 has a high pressure (HP) rotor system 702 and a low pressure (LP) rotor system 704. The engine 700 includes a fan rotor 742, a gear box 746, and a low pressure turbine rotor 730. The HP rotor system 702 and the LP rotor system 704 may include features described with respect to FIG. 1. The HP rotor system 702 may include a high pressure (HP) shaft 703 that is supported by a bearing assembly 705. The bearing assembly 705 includes a first bearing assembly 706, a second bearing assembly 708, and a third bearing assembly 710.

As shown in FIG. 8, the first bearing assembly 706 may include one or more ball bearings 707. The second bearing assembly 708 may include one or more ball bearings 709. The first bearing assembly 706 and the second bearing assembly 708 are formed together as a single, unitary bearing assembly. That is, the first bearing assembly 706 and the second bearing assembly 708 share a single bearing housing 713, a single outer bearing race 715, and a single bearing inner race 717. In some examples, no squeeze film damper is provided for the bearing housing 713. The third bearing assembly 710 may include one or more roller bearings 711.

Figure 9:
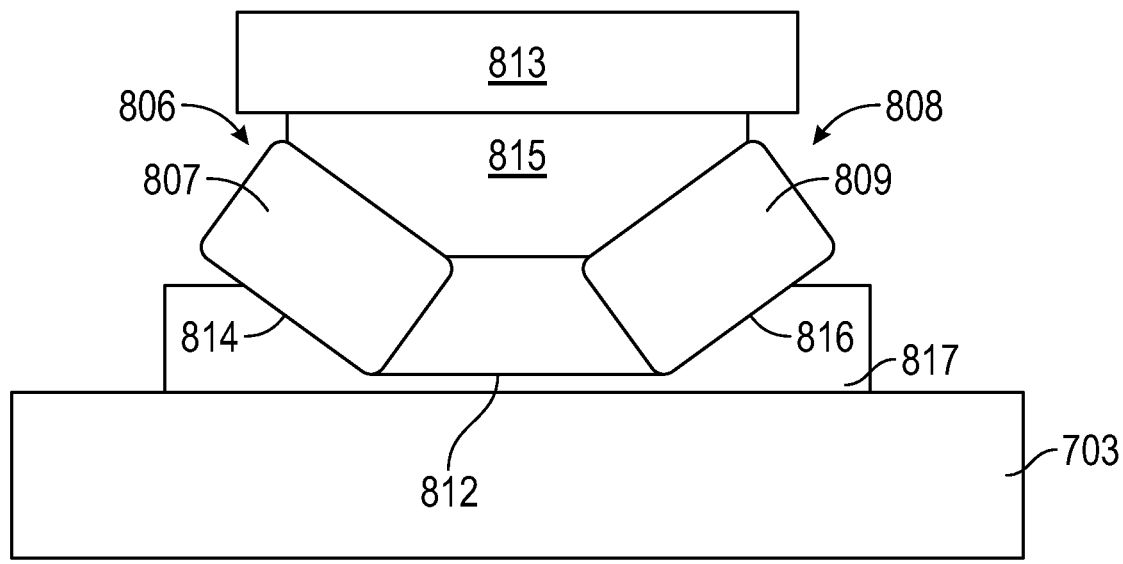
FIG. 9 illustrates a bearing for the bearing assembly of the aspect of FIG. 6 or the aspect of FIG. 7, according to the present disclosure.
Figure 10:
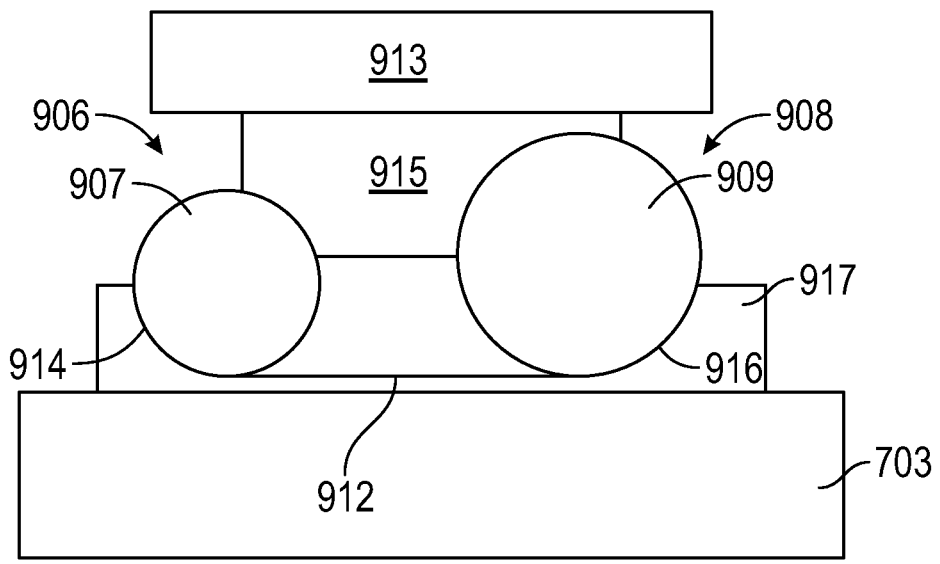
FIG. 10 illustrates a bearing for the bearing assembly of the aspect of FIG. 6 or the aspect of FIG. 7, according to the present disclosure.

FIGS. 9 and 10 illustrate exemplary bearing assemblies that may be employed in the bearing assembly 705 of FIG. 8 to support the load of the rotating shaft 703. In the aspect of FIG. 9, the bearing assembly includes roller bearings, whereas in the aspect of FIG. 10, as in the aspect of FIG. 8, the bearing assembly includes ball bearings.

FIG. 9 illustrates a bearing assembly 800 that may be the bearing assembly 705 of the FIG. 8 aspect. In FIG. 9, the bearing assembly 800 is formed of a first bearing assembly 806 and a second bearing assembly 808. The first bearing assembly 806 includes one or more first roller bearings 807. The second bearing assembly 808 includes one or more second roller bearings 809. Similar to the FIG. 8 aspect, the first bearing assembly 806 and the second bearing assembly 808 share the same outer race 815 and inner race 817. The first bearing assembly 806 and the second bearing assembly 808 also share the same bearing housing 813. The inner race 817 includes a groove 812 that receives the one or more first roller bearings 807 and the one or more second roller bearings 809. The groove 812 may include a first angled surface 814 on which the first roller bearing 807 rests and a second angled surface 816 on which the second roller bearing 809 rests. The angle of the surfaces may mate, conform, or otherwise align with the outer surface of the one or more first roller bearings 807 and the one or more second roller bearings 809.

FIG. 10 illustrates a bearing assembly 900 that may be the bearing assembly 705 of the FIG. 8 aspect. In the FIG. 10 aspect, the bearing assembly 900 is formed of a first bearing assembly 906 and a second bearing assembly 908. The first bearing assembly 906 includes one or more first ball bearings 907. The second bearing assembly 908 includes one or more second ball bearings 909. Similar to the FIG. 8 aspect, the first bearing assembly 906 and the second bearing assembly 908 share the same outer race 915 and inner race 917. The first bearing assembly 906 and the second bearing assembly 908 also share the same bearing housing 913. The inner race 917 includes a groove 912 that receives the one or more first ball bearings 907 and the one or more second ball bearings 909. The groove 912 may include a first curved surface 914 on which the first ball bearing 907 rests and a second curved surface 916 on which the second ball bearing 909 rests. The curvature of the surfaces may mate, conform, or otherwise align with the outer surface of the one or more first ball bearings 907 and the one or more second ball bearings 909.

In some examples, such as described with respect to FIGS. 7 and 8, the lower pressure rotor systems have the fan rotor and LP rotor connected by a gearbox with an overall gear ratio greater than 1.5. The high pressure rotor and the bearings system are connected with the LP/HP rotor and the gearbox systems by frames. The ratio of the speed of the HP rotor and the speeds of the LP rotors is between two to ten. For the combined ball and roller bearing systems at the forward end of the HP rotor, the stiffness of the roller bearing support systems are one and one half to five times greater than the support of the ball bearing system. The ratio of aft roller bearing support stiffness to the total stiffness of the combined ball/roller support stiffness shall be greater than four.

The bearing assemblies of the foregoing disclosure are employed to address thrust crossover conditions in a bearing. That is, the bearing is typically loaded in a forward direction. In some cases, due to leakage or otherwise, as described previously, the direction of loading changes to the aft direction. During the no load, or very low load condition (e.g., the point at which the thrust switches from forward to aft), there may be no radial stiffness or low radial stiffness exhibited by the bearing, which results in high vibrations of the rotating shaft. The bearing assemblies of the foregoing disclosure address this issue by supplementing the stiffness with a false bearing that supports the rotating shaft during thrust crossover conditions.

In the bearing assemblies of the foregoing disclosure, the primary bearing may be a larger bearing than the secondary or false bearing. The larger, primary bearing always takes the load during high loading or high thrust conditions. During crossover or aft thrust conditions, the smaller, secondary bearing adds resistance to take the load in the aft direction. In the examples where the bearing assemblies are mounted in series, the smaller bearing is dependent on the larger bearing. In the examples where the bearing assembles are mounted in parallel, the smaller bearing is independent of the larger bearing.

Accordingly, the bearing assemblies of the present disclosure provide axial stiffness during low thrust conditions to mitigate, to reduce, or to eliminate high N2 vibrations, NSV, and whirl instability. Furthermore, the bearing assemblies of the present disclosure improve takeoff weight for rotators that may otherwise cause high imbalance in the engine. The present disclosure provides an effective manner to control unique engine vibrations, NSV, whirl, unbalance responses of the high pressure rotor, and reduce the vibration effect of the low pressure to high pressure rotor systems due to the multiple speeds of the geared low pressure rotor. This results in improved time on wing for the rotors and improved productivity.

Further aspects are provided by the subject matter of the following clauses.

A gas turbine engine comprises a rotating shaft and a bearing assembly. The bearing assembly is configured to support the rotating shaft, the bearing assembly having a first bearing and a second bearing, the first bearing being configured to support an axial load of the rotating shaft when a forward thrust of the rotating shaft is greater than ten percent, and the second bearing being configured to support the axial load of the rotating shaft when a thrust of the rotating shaft is between ten percent forward thrust and ten percent aft thrust, inclusive of the end points.

The gas turbine engine of the preceding clause, the rotating shaft being a high pressure shaft.

The gas turbine engine of any preceding clause, the first bearing and the second bearing being connected in parallel.

The gas turbine engine of any preceding clause, the first bearing and the second bearing being connected in series.

The gas turbine engine of any preceding clause, the first bearing being a ball bearing and the second bearing is a roller bearing.

The gas turbine engine of any preceding clause, the first bearing and the second bearing being each ball bearings that share an inner race and an outer race.

The gas turbine engine of any preceding clause, the first bearing and the second bearing being each roller bearings that share an inner race and an outer race.

The gas turbine engine of any preceding clause, the first bearing being supported by a first bearing housing, a first bearing inner race, and a first bearing outer race, and the second bearing is supported by a second bearing housing, a second bearing inner race, and a second bearing outer race.

The gas turbine engine of any preceding clause, further comprising a first bearing biasing member located between an axially forward facing outer surface of the first bearing outer race and an axially aft facing outer surface of the first bearing housing.

The gas turbine engine of any preceding clause, the axially aft facing outer surface being located on a radially inward extending portion of the first bearing housing.

The gas turbine engine of any preceding clause, further comprising a first bearing biasing member located between an axially aft facing outer surface of the first bearing outer race and an axially forward facing outer surface of the first bearing housing.

The gas turbine engine of any preceding clause, the axially forward facing outer surface being located on a radially inward extending portion of the first bearing housing.

The gas turbine engine of any preceding clause, further comprising a second bearing biasing member located between an axially aft facing outer surface of the second bearing outer race and an axially forward facing outer surface of the second bearing housing.

The gas turbine engine of any preceding clause, the axially forward facing outer surface being located on a radially inward extending portion of the second bearing housing.

The gas turbine engine of any preceding clause, further comprising a second bearing biasing member located between an axially forward facing outer surface of the second bearing outer race and an axially aft facing outer surface of the second bearing housing.

The gas turbine engine of any preceding clause, the axially aft facing outer surface being located on a radially inward extending portion of the second bearing housing.

The gas turbine engine of any preceding clause, further comprising a first bearing biasing member coupled to the first bearing and a second bearing biasing member coupled to the second bearing, the first bearing biasing member having a stiffness that is ten percent to fifty percent less than a stiffness of the second bearing biasing member.

The gas turbine engine of any preceding clause, further comprising a first bearing housing and a second bearing housing, the first bearing biasing member is coupled between an outer race of the first bearing and the first bearing housing and the second bearing biasing member is coupled between an outer race of the second bearing and the second bearing housing, and the first bearing housing has a stiffness that is ten percent to fifty percent less than a stiffness of the second bearing housing.

The gas turbine engine of any preceding clause, the first bearing biasing member, the second bearing biasing member, or both, being a spring, a low alpha material, a strain based shape memory alloy, a high alpha material, a temperature based shape memory alloy, or any combination thereof.

A method of controlling rotor thrust loading in a gas turbine engine comprises rotating a shaft of the gas turbine engine to produce a forward thrust, loading a primary bearing with an axial thrust load from the shaft during the forward thrust, reducing the forward thrust to less than ten percent forward thrust to produce a thrust crossover, and loading a secondary bearing with the axial thrust load from the shaft during the thrust crossover, the primary bearing supporting the majority of the axial thrust load during the forward thrust and the secondary bearing supports the majority of the axial thrust load during the thrust crossover.

The method of any preceding clause, the secondary bearing being activated during the thrust crossover to support the axial thrust load.

The method of any preceding clause, the activating comprising heating a spring coupled to the primary bearing to reduce a stiffness of the spring.

The method of any preceding clause, during the forward thrust, the primary bearing supporting eighty percent to ninety five percent of the axial thrust load and, during thrust crossover, the primary bearing supports zero to twenty percent of the axial thrust load.

The method of any preceding clause, further comprising rotating the shaft of the gas turbine engine to produce an aft thrust, the primary bearing supporting the majority of the axial thrust load during the aft thrust.

The method of any preceding clause, the primary bearing being activated during the aft thrust to support the axial thrust load.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gas turbine engine comprising:
   a rotating shaft; and
   a bearing assembly configured to support the rotating shaft, the bearing assembly having a first bearing and a second bearing, wherein the first bearing is configured to support an axial load of the rotating shaft when a forward thrust of the rotating shaft is greater than ten percent, and wherein the second bearing is configured to support the axial load of the rotating shaft when a thrust of the rotating shaft is between ten percent forward thrust and ten percent aft thrust, inclusive of the end points.

2. The gas turbine engine of claim 1, wherein the rotating shaft is a shaft in a high pressure rotor system.

3. The gas turbine engine of claim 1, wherein the first bearing and the second bearing are connected in parallel.

4. The gas turbine engine of claim 1, wherein the first bearing and the second bearing are connected in series.

5. The gas turbine engine of claim 1, wherein the first bearing is a ball bearing and the second bearing is a roller bearing.

6. The gas turbine engine of claim 1, wherein the first bearing and the second bearing are each ball bearings that share an inner race and an outer race.

7. The gas turbine engine of claim 1, wherein the first bearing and the second bearing are each roller bearings that share an inner race and an outer race.

8. The gas turbine engine of claim 1, wherein the first bearing is between two and ten times stiffer than the second bearing.

9. The gas turbine engine of claim 1, wherein the first bearing is supported by a first bearing housing, a first bearing inner race, and a first bearing outer race, and the second bearing is supported by a second bearing housing, a second bearing inner race, and a second bearing outer race.

10. The gas turbine engine of claim 9, further comprising a first bearing biasing member located between an axially forward facing outer surface of the first bearing outer race and an axially aft facing outer surface of the first bearing housing.

11. The gas turbine engine of claim 10, wherein the axially aft facing outer surface is located on a radially inward extending portion of the first bearing housing.

12. The gas turbine engine of claim 9, further comprising a first bearing biasing member located between an axially aft facing outer surface of the first bearing outer race and an axially forward facing outer surface of the first bearing housing.

13. The gas turbine engine of claim 12, wherein the axially forward facing outer surface is located on a radially inward extending portion of the first bearing housing.

14. The gas turbine engine of claim 9, further comprising a second bearing biasing member located between an axially aft facing outer surface of the second bearing outer race and an axially forward facing outer surface of the second bearing housing.

15. The gas turbine engine of claim 14, wherein the axially forward facing outer surface is located on a radially inward extending portion of the second bearing housing.

16. The gas turbine engine of claim 9, further comprising a second bearing biasing member located between an axially forward facing outer surface of the second bearing outer race and an axially aft facing outer surface of the second bearing housing.

17. The gas turbine engine of claim 16, wherein the axially aft facing outer surface is located on a radially inward extending portion of the second bearing housing.

18. The gas turbine engine of claim 1, further comprising a first bearing biasing member coupled to the first bearing and a second bearing biasing member coupled to the second bearing, the first bearing biasing member having a stiffness that is ten percent to fifty percent less than a stiffness of the second bearing biasing member.

19. The gas turbine engine of claim 18, further comprising a first bearing housing and a second bearing housing, the first bearing biasing member is coupled between an outer race of the first bearing and the first bearing housing and the second bearing biasing member is coupled between an outer race of the second bearing and the second bearing housing, and the first bearing housing has a stiffness that is ten percent to fifty percent less than a stiffness of the second bearing housing.

20. The gas turbine engine of claim 19, wherein the first bearing biasing member, the second bearing biasing member, or both, are a spring, a shape memory alloy, a strain dependent material, a temperature dependent material, or any combination thereof.

\* \* \* \* \*